United States Patent [19]

Cobin

[11] 4,182,505
[45] Jan. 8, 1980

[54] MUSICAL INSTRUMENT HANGER AND COVER THEREFOR

[76] Inventor: Robert B. Cobin, 426 7th Ave. South, Nashville, Tenn. 37203

[21] Appl. No.: 910,039

[22] Filed: May 26, 1978

[51] Int. Cl.² ............................................. F16M 13/00
[52] U.S. Cl. .................................... 248/220.4; 248/1; 248/345.1; 150/52 R
[58] Field of Search ............... 248/220.4, 221.1, 345.1; 150/52 R, 52 M

[56] References Cited

U.S. PATENT DOCUMENTS

| 571,025 | 11/1896 | Spamer | 150/52 R X |
|---|---|---|---|
| 1,804,841 | 5/1931 | Pedroli | 248/345.1 |
| 2,051,408 | 8/1936 | Karst | 211/65 |
| 2,502,912 | 4/1950 | Andrew | 248/345.1 |
| 4,027,687 | 6/1977 | McGowan | 150/52 R |
| 4,037,815 | 7/1977 | DeLano | 248/285 |

Primary Examiner—William H. Schultz
Attorney, Agent, or Firm—Beveridge, DeGrandi, Kline & Lunsford

[57] ABSTRACT

A musical instrument, supported between longitudinal extensions which project from a lateral base portion of a hanger, is protected from marring by tubular bodies which cover the longitudinal extensions. Elongated flexible retaining means attached to the tubular bodies are wrappable about the lateral base portion to provide a protective covering on the lateral base portion and to retain the associated tubular body on the respective longitudinal extension. A fastener on the retaining means holds the retaining means in wrapped relation on the lateral base portion.

8 Claims, 4 Drawing Figures

MUSICAL INSTRUMENT HANGER AND COVER THEREFOR

BACKGROUND AND SUMMARY OF THE INVENTION

This invention relates to a device for supporting musical instruments and to a cover for a musical instrument support.

Guitars and other stringed musical instruments are customarily displayed in retail stores by suspending them from an aperture board system which includes a set of hangers. Each hanger has a lateral base portion and a pair of longitudinal extensions which provide therebetween a space for receiving the neck of the instrument.

Such display hangers are unattractive in some respects and, more significantly, they have regularly resulted in damage to the instruments, causing mars and scars where the metal hanger comes into contact with the instrument.

While I am unaware of any protective coverings used for such musical instrument hangers, I learned after making this invention that protective coverings have been used on devices for engaging the neck of a guitar, such a construction being shown by the DeLano U.S. Pat. No. 4,037,815. I have also learned that protective sleeves of soft material have been used on parallel wire arms of a paint brush hanger as shown by Karst U.S. Pat. No. 2,051,408. These prior devices, while providing a protective or cushioning effect, possess a different structure than the present invention which further possesses an elongated and flexible retaining means such as a strap, wrappable around the lateral base portion of a hanger to retain the device in position and provide a protective covering on the lateral base portion.

The present invention is directed to a protective device for covering a musical instrument hanger which has a lateral base portion and a pair of longitudinal extensions which provide a space for receiving the musical instrument. The device includes at least one tubular body connected to an elongated flexible retaining means. The tubular body covers a longitudinal extension of the hanger and the retaining means wraps around the lateral base portion to retain the tubular body on the longitudinal extension and to provide a protective covering on the lateral base portion. A fastener on the retaining means holds it in wrapped relation on the lateral base portion. When constructed according to the invention, the device is relatively uncomplicated, attractive and serves the very important function of preventing damage to a supported musical instrument.

Preferably, the device is formed of a single sheet of material having an H-shape which includes a pair of parallel legs and a central crosspiece connecting the legs. Each of the legs has a tubular body extending in one direction from the crosspiece and a retaining means extending in the other direction from the crosspiece. The tubular bodies may be formed of portions of the sheet material which are turned and attached to themselves as by stitching.

BRIEF DESCRIPTION OF A PREFERRED EMBODIMENT

Figure 1:
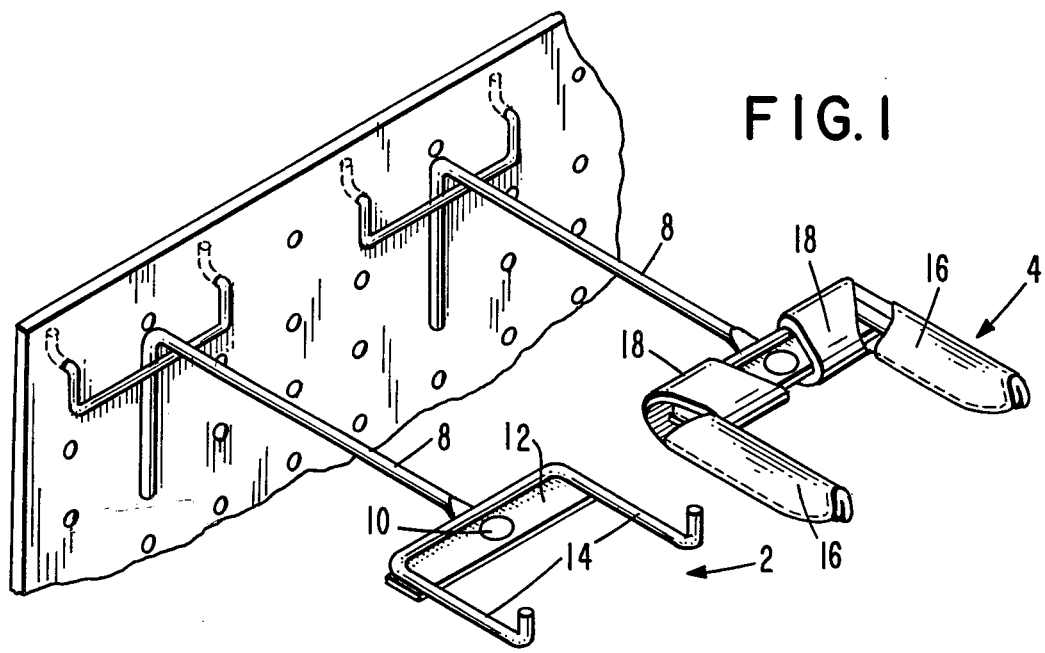
FIG. 1 is a perspective view showing two musical instrument hangers, one being unprotected and the other being provided with the protective cover of this invention.

FIG. 1 shows an unprotected prior art musical instrument hanger 2 and an identical musical instrument hanger 4 improved by covering it with the protective device of this invention. Both hangers 2 and 4 are supported by an aperture board in a conventional manner. Each hanger has a horizontal rod 8 connected at its outer extremity by a rivet 10 to a crossplate 12. A stiff U-shaped wire is welded or brazed to the upper surface of plate 12 to provide the hanger with a pair of longitudinal extensions or legs 14 having upturned outer ends. The crossplate 12 and the base portion of the U-shaped wire form a lateral base portion of the hanger. The space between the legs 14 is adapted to receive and support a musical instrument, in most instances a guitar or other stringed musical instrument having its neck engaged by the device.

Figure 2:
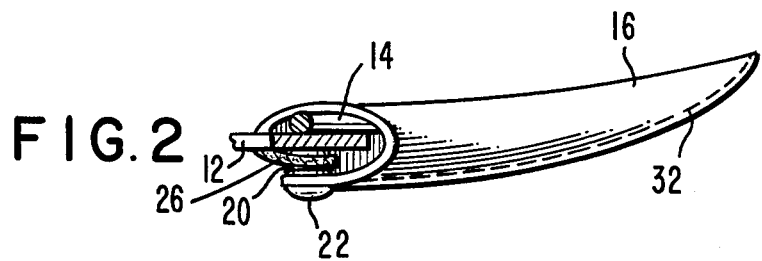
FIG. 2 is a sectional view of the invention as seen along the line 2—2 in FIG. 1.

The improved instrument hanger 4 is structurally identical to the hanger 2, but is also provided with the protective cover of the invention. This protective cover includes a pair of parallel tubular bodies or sleeves 16 which cover the legs 14 and prevent the marring of a musical instrument supported on the hanger. A pair of flexible elongated straps 18 are wrapped around the lateral base portion of the hanger where they are held in position by a pair of cooperating snap fasteners 20 and 22 as shown in FIG. 2. These straps 18 serve the dual functions of providing a protective covering on the lateral base portion of the hanger, and retaining the sleeves 16 on the hanger to prevent their inadvertent removal.

Preferably, the device is formed of a single piece of flexible sheet material such as leather. A blank of such material may be cut to the configuration shown in FIG. 3 which is generally H-shaped, having a pair of parallel legs 24 joined together by a crosspiece 26. Holes 28 are punched in the blank to receive the strap-retaining fasteners.

Figure 3:
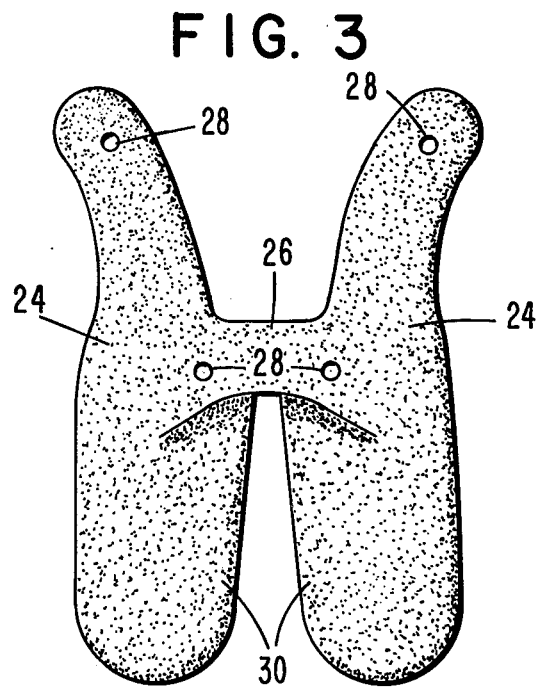
FIG. 3 is a plan view of the blank of sheet material used for forming the cover of this invention.
Figure 4:
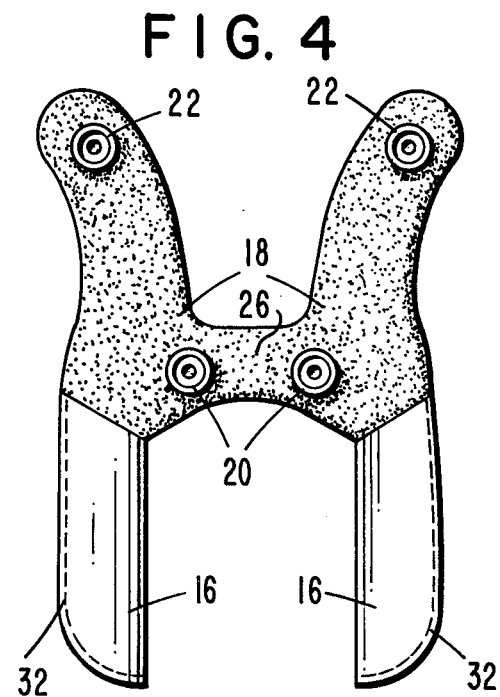
FIG. 4 is a plan view of the cover of this instrument, laid flat prior to its attachment to a musical instrument hanger.

The blank of FIG. 3 is made into the completed product shown in FIG. 4 by turning over the flaps 30 and attaching the material to itself by lines of stitching 32. This produces the tubular sleeves 16. Snap fasteners are placed in the holes 28 with downwardly-projecting male snap fastener elements 20 being located on the crosspiece 26 and upwardly-open female snap fastener elements 22 being located at the outer ends of the strap portions 18 of the device. As will be seen in FIG. 4, both of the tubular protective sleeves 16 extend in one direction from the crosspiece 26, and both of the retaining straps 18 extend in the opposite direction from the crosspiece 26.

The completed protective device is placed on a hanger such as the hanger 2 by placing the sleeves 16 over the legs 14, wrapping the straps 18 around the base of the hanger including crossplate 12 and then engaging the snap fasteners 20 and 22 as shown in FIG. 2. In its final installed position, the device is securely held on the hanger, and those surfaces which confront a musical instrument supported in the hanger are covered by the protective material of the device.

It will be evident that this device is susceptible to numerous modifications without departing from its basic principles. For example, adhesives or elastics may serve as the fasteners for the straps 18. Therefore, it is emphasized that the invention is not limited to the sole preferred embodiment disclosed herein, but is embracing of other structures which fall within the spirit of the following claims.

I claim:

1. A protective device for covering a musical instrument hanger which has a lateral base portion and a pair of longitudinal extensions which provide therebetween a space for receiving the musical instrument, said device having an H-shape which includes a pair of parallel legs and a central crosspiece connecting said legs, each of said parallel legs having a tubular body extending in one direction from said crosspiece for covering said longitudinal extensions to prevent said extensions from marring a musical instrument supported thereon, each of said parallel legs including retaining means extending in the other direction from said crosspiece and attached to said tubular bodies for preventing inadvertent removal of said tubular bodies from their respective longitudinal extensions, said retaining means being elongated and flexible to permit it to be wrapped around said lateral base portion of the hanger to retain its associated tubular body on a said longitudinal extension to provide a protective covering on said lateral base portion, a fastener on said retaining means for holding said retaining means in wrapped relation on said transverse base portion when the respective said tubular body is on a said longitudinal extension.

2. The device of claim 1 formed of a single piece of sheet material, said tubular body being formed of a portion of said sheet material which is turned and attached to itself, said retaining means being a portion of said sheet material which extends from the tubular body.

3. The device of claim 1 having a pair of said fastener means each including a fastener element located on the crosspiece and an element located on said retaining means spaced from said crosspiece.

4. A musical instrument hanger covered by a protective device, said hanger having a lateral base portion and a pair of longitudinal extensions which provide therebetween a space for receiving the musical instrument, said protective device comprising tubular bodies covering said longitudinal extensions to prevent said extensions from marring a musical instrument supported thereon, retaining means attached to said tubular bodies for preventing inadvertent removal of said tubular bodies from their respective longitudinal extensions, said retaining means being elongated, flexible and wrapped around said lateral base portion of the hanger to retain its associated tubular body on a said longitudinal extension and to provide a protective covering on said lateral base portion, a fastener on said retaining means for holding said retaining means in wrapped relation on said lateral base portion.

5. The invention of claim 4 formed of a single piece of sheet material, said tubular body being formed of a portion of said sheet material which is turned and attached to itself, said retaining means being a portion of said sheet material which extends from the tubular body.

6. The invention of claim 4 having an H-shape which includes a pair of parallel legs and a central crosspiece connecting said legs, each of said parallel legs having a said tubular body extending in one direction from said crosspiece and a retaining means extending in the other direction from said crosspiece.

7. The invention of claim 6 formed of a single piece of sheet material, said tubular body being formed of a portion of said sheet material which is turned and attached to itself, said retaining means being a portion of said sheet material which extends from the tubular body.

8. The invention of claim 6 having a pair of said fastener means each including a fastener element located on the crosspiece and an element located on said retaining means spaced from said crosspiece.

* * * * *